United States Patent
Kim et al.

(10) Patent No.: US 12,334,588 B2
(45) Date of Patent: *Jun. 17, 2025

(54) SEPARATOR FOR ELECTROCHEMICAL DEVICE AND AN ELECTROCHEMICAL DEVICE INCLUDING SAME

(71) Applicant: LG ENERGY SOLUTION, LTD., Seoul (KR)

(72) Inventors: Min Ji Kim, Daejeon (KR); Seung Hyun Lee, Daejeon (KR); Kyung Ryun Ka, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/582,120

(22) Filed: Feb. 20, 2024

(65) Prior Publication Data

US 2024/0195011 A1 Jun. 13, 2024

Related U.S. Application Data

(63) Continuation of application No. 18/243,009, filed on Sep. 6, 2023, now Pat. No. 11,949,125.

(30) Foreign Application Priority Data

Sep. 6, 2022 (KR) .................. 10-2022-0112886

(51) Int. Cl.
*H01M 50/446* (2021.01)
*H01M 50/431* (2021.01)
*H01M 50/443* (2021.01)

(52) U.S. Cl.
CPC ....... *H01M 50/446* (2021.01); *H01M 50/431* (2021.01); *H01M 50/443* (2021.01)

(58) Field of Classification Search
None
See application file for complete search history.

(56) References Cited

U.S. PATENT DOCUMENTS 10,991,926 B2 4/2021 Kwon
11,949,125 B2 * 4/2024 Kim .................. H01M 50/457
(Continued)

FOREIGN PATENT DOCUMENTS

JP 2015-41603 A 3/2015
JP 2022-26936 A 2/2022
(Continued)

OTHER PUBLICATIONS

Machine translation of KR 10-2016-0069386, published on Jun. 16, 2016 (Year: 2016).
(Continued)

*Primary Examiner* — Anca Eoff
(74) *Attorney, Agent, or Firm* — Birch, Stewart, Kolasch & Birch, LLP (57) ABSTRACT

A separator for an electrochemical device including a porous polymer substrate and a porous coating layer on at least one side of the porous polymer substrate. The porous coating layer includes first binder particles, second binder particles, and inorganic particles. The inorganic particles are mostly dispersed in a first surface region of the porous coating layer, and the second binder particles are mostly dispersed in a second surface region of the porous polymer substrate, in which the first surface region faces the porous polymer substrate and the second surface region is an opposite surface region to the first surface region. The inorganic particles have a larger weight per particle than each respective weight per particle of the first and second binder particles.

13 Claims, 5 Drawing Sheets (56) References Cited

U.S. PATENT DOCUMENTS

| | | |
|---|---|---|
| 2008/0292968 A1 | 11/2008 | Lee |
| 2013/0302661 A1 | 11/2013 | Kim |
| 2016/0141579 A1 | 5/2016 | Seok |
| 2020/0127264 A1 | 4/2020 | Kim |
| 2020/0251708 A1 | 8/2020 | Kwon |
| 2023/0138132 A1* | 5/2023 | Kim .................. H01M 10/0525 |
| | | 429/144 |
| 2024/0274979 A1* | 8/2024 | Ka ...................... H01M 50/449 |

FOREIGN PATENT DOCUMENTS

| | | |
|---|---|---|
| KR | 10-2013-0126445 A | 11/2013 |
| KR | 10-2016-0069386 A | 6/2016 |
| KR | 10-2017-0055440 A | 5/2017 |
| KR | 10-2018-0034393 A | 4/2018 |
| KR | 10-2018-0068968 A | 6/2018 |
| KR | 10-2019-0004158 A | 1/2019 |
| KR | 10-2020-0085185 A | 7/2020 |
| KR | 10-2020-0107602 A | 9/2020 |
| KR | 10-2020-0128550 A | 11/2020 |
| KR | 10-2022-0011097 A | 1/2022 |
| KR | 10-2022-0029513 A | 3/2022 |
| KR | 10-2022-0047200 A | 4/2022 |
| KR | 10-2437371 B1 | 8/2022 |
| WO | WO 2022/019572 A1 | 6/2022 |

OTHER PUBLICATIONS

Machine translation of WO 2022/019572, published on Jun. 27, 2022 (Year: 2022).

\* cited by examiner

SEPARATOR FOR ELECTROCHEMICAL DEVICE AND AN ELECTROCHEMICAL DEVICE INCLUDING SAME

CROSS REFERENCE TO RELATED APPLICATION

The present application is a continuation of U.S. application Ser. No. 18/243,009 filed Sep. 6, 2023, which claims priority to Korean Patent Application No. 10-2022-0112886, filed Sep. 6, 2022, the entire contents of which is incorporated herein for all purposes by this reference.

BACKGROUND OF THE INVENTION

1. Field of the Invention

The present disclosure relates to a separator for an electrochemical device separator having improved dry and wet adhesive strength and an electrochemical device having the same.

2. Description of the Related Art

An electrochemical device converts chemical energy into electrical energy by using an electrochemical reaction.

Recently, a lithium secondary battery having high energy density and voltage and a long life-cycle and being usable in various fields has been widely used.

A lithium secondary battery may include an electrode assembly including a cathode, an anode, and a separator interposed between the cathode and the anode. The electrode assembly may be encased along with an electrolyte. The separator is interposed between the cathode and the anode to insulate the electrodes from each other and may include a porous coating layer including a polymer binder and inorganic particles on at least one surface of a porous polymer substrate. The inorganic particles may be connected to other inorganic particles by the polymer binder to form an interstitial volume, and lithium ions may move through the interstitial volume. The polymer binder may impart adhesion to the porous coating layer as well as fix the inorganic particles, and the porous coating layer may be bonded to each of the porous polymer substrate and the electrode.

The porous coating layer including the polymer binder and the inorganic particles may prevent thermal shrinkage of the porous polymer substrate. The porous coating layer may be formed by applying and drying a slurry including the polymer binder, the inorganic particles, and a solvent on a porous polymer substrate. Since the solvent volatilizes during the application and drying of the slurry, the polymer binder and the inorganic particles may migrate. The migration of the polymer binder and the inorganic particles may be determined by various factors such as the physical properties of the polymer binder and the inorganic particles, the physical properties of the slurry, and the drying conditions.

In particular, the physical properties of the polymer binder and inorganic particles may be the main factors determining the structure and function of the porous coating layer. For example, by controlling the above factors, the polymer binder may be dispersed in the porous coating layer, specifically on a surface region opposite to a surface facing the porous polymer substrate, thereby securing the adhesive strength of the separator to the electrode. However, even when the polymer binder is dispersed in the surface region, if the particle size of the polymer binder is smaller than that of the inorganic particles, the polymer binder particles cannot migrate because they are stuck between the inorganic particles, or the polymer binder cannot be present in the surface region of the porous coating layer, thereby not exhibiting sufficient adhesive strength.

Therefore, research is being conducted on development of a porous coating layer-provided separator that is not deteriorated in adhesive strength through control of the physical properties of a polymer binder and inorganic particles.

SUMMARY OF THE INVENTION

An objective of the present disclosure is to provide a separator for an electrochemical device including a porous coating layer having a surface on which binder particles providing wet adhesive strength are positioned, and an electrochemical device having excellent adhesive strength with respect to an electrode even after an electrolyte solution is injected due to the inclusion of the separator.

One aspect of the present disclosure provides a separator for an electrochemical device including a porous polymer substrate and a porous coating layer on at least one side of the porous polymer substrate, in which the porous coating layer includes first binder particles, second binder particles, and inorganic particles, and a majority of the inorganic particles are dispersed in a first surface region facing the porous polymer substrate, a majority of the second binder particles are dispersed in a second surface region opposite to the first surface region, and the inorganic particles have a weight per particle greater than each respective weight per particle of the first binder particles and the second binder particles.

The weight per particle of the first binder particles may be greater than that of the second binder particles. The weight per particle of the first binder particles and weight per particle of the second binder particles may be obtained by using the density of the particles and a diameter (D50) of the particles, respectively, before preparing the slurry for forming the porous coating layer.

At least one of the first binder particles and the second binder particles may be aqueous binder particles.

Each of the first binder particles and the inorganic particles may be spherical particles, and a diameter (D50) of the first binder particles may be greater than or equal to a radius of the inorganic particles.

The second binder particles may be spherical particles, and the diameter (D50) of the second binder particles may be greater than or equal to the radius of the first binder particles.

The density of the second binder particles may be greater than that of the first binder particles.

The first binder particles may provide an adhesive strength between the separator and the electrode in a dry state of the separator, and the second binder particles may provide an adhesive strength between the separator and the electrode in a state in which the separator is impregnated with an electrolyte solution.

The inorganic particles may be at least one selected from the group consisting of $Li_3PO_4$, $Li_xTi_y(PO_4)_3$ ($0<x<2$, $0<y<3$), $Li_xAl_yTi_z(PO_4)_3$ ($0<x<2$, $0<y<1$, $0<z<3$), $Li_xLa_yTiO_3$ ($0<x<2$, $0<y<3$), $Li_xGe_yP_zS_w$ ($0<x<4$, $0<y<1$, $0<z<1$, $0<w<5$), $Li_xN_y$ ($0<x<4$, $0<y<2$), $Li_xSi_yS_z$ ($0<x<3$, $0<y<2$, $0<z<4$), $Li_xP_yS_z$ ($0<x<3$, $0<y<3$, $0<z<7$), $Li_7La_3Zr_2O_{12}$, $BaTiO_3$, $BaSO_4$, $Pb(Zr, Ti)O_3$ (PZT), $Pb_{1-x}La_xZr_{1-y}TiyO_3$ (PLZT, $0<x<1$, $0<y<1$), $Pb(Mg_{1/3}Nb_{2/3})O_3$—$PbTiO_3$ (PMN-PT), $HfO_2$, $Sb_2O_3$, $Sb_2O_4$, $Sb_2O_5$, $SrTiO_3$, $SnO_2$, $CeO_2$, $MgO$, $Mg(OH)_2$, $NiO$, $CaO$, $ZnO$, $Zn_2SnO_4$, $ZnSnO_3$, $ZnSn(OH)_6$, $ZrO_2$, $Y_2O_3$, $SiO_2$, $Al_2O_3$, $AlOOH$, $Al(OH)_3$, $SiC$, $TiO_2$, $H_3BO_3$, and $HBO_2$.

The porous coating layer may include a polymer binder, including the first binder particle and the second binder particles, and the inorganic particles in a weight ratio of 10:90 to 50:50.

The porous coating layer may include the first binder particles and the second binder particles in a weight ratio of 1:0.5 to 1:1.5.

The porous coating layer may have a thickness in a range of 1.5 μm to 5 μm.

Another aspect of the present disclosure provides an electrochemical device including a cathode, an anode, and a separator interposed between the cathode and the anode, in which the separator may be a separator, according to an aspect of the present disclosure.

The electrochemical device may be a lithium secondary battery.

Figure 1:
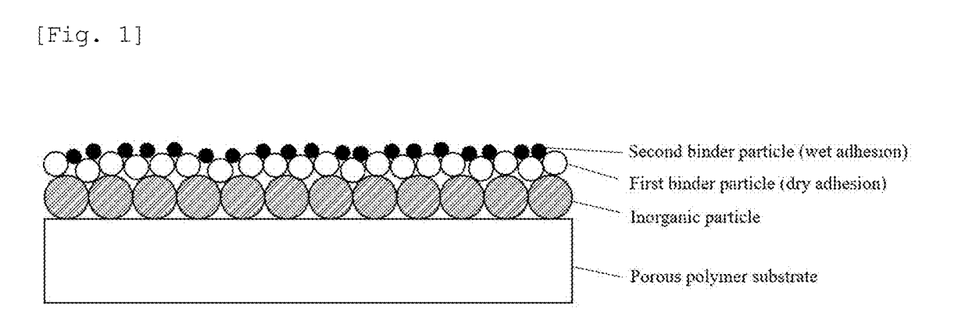
FIG. 1 is a schematic of a separator according to the present application.
Figure 2:
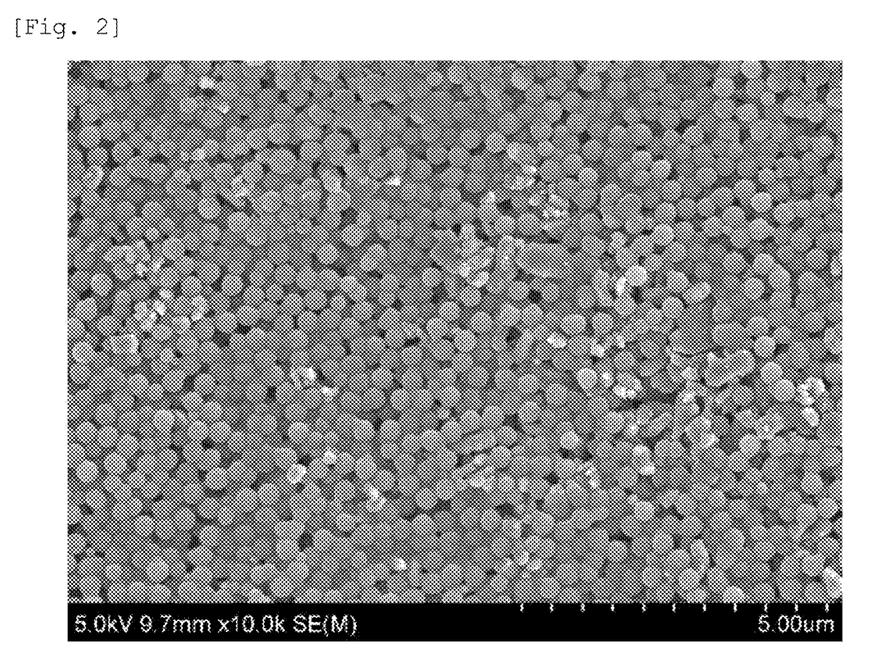
FIG. 2 shows an SEM image of a cross-section of the separator of Example 1.
Figure 3:
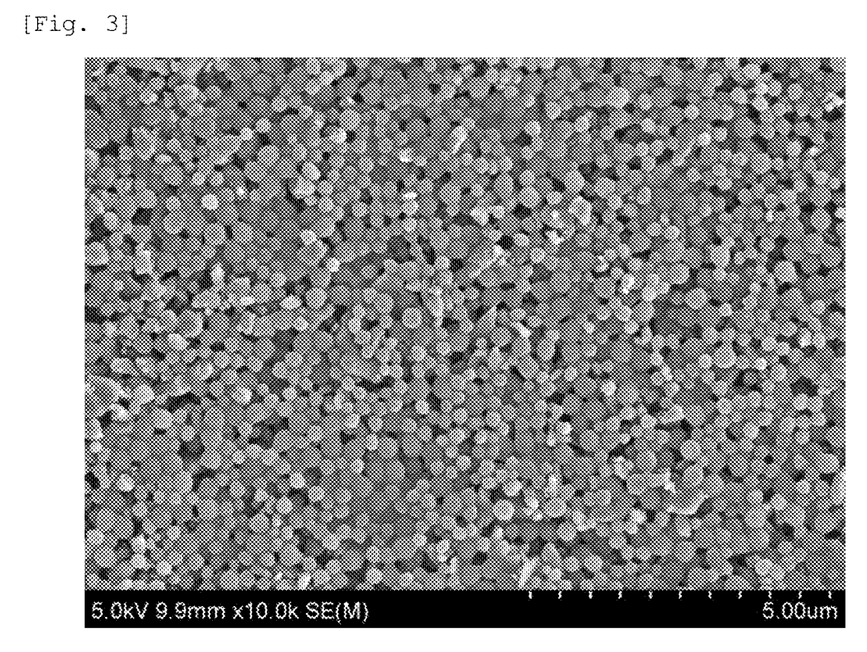
FIG. 3 shows an SEM image of a cross-section of the separator of Example 2.

As shown in FIG. 1, the separator, according to the present disclosure, may be formed such that the inorganic particles, the first binder particles, and the second binder particles are sequentially distributed from the surface close to the porous polymer substrate in the porous coating layer, thereby providing wet adhesive strength by the second binder particles even after the separator is wetted with an electrolyte.

DESCRIPTION OF THE PREFERRED EMBODIMENTS

Hereinafter, each configuration of the present disclosure will be described in more detail so that those skilled in the art may easily perform the present disclosure, but this is merely an example, and the scope of the present disclosure is not limited to the following.

The term "include" used in this specification is used to list materials, compositions, devices, and methods useful for this disclosure and is not limited to the listed examples.

As used herein, "about" and "substantially" are used in the sense of a range or close to that number or degree, in consideration of inherent manufacturing and material tolerances, and accurate or absolute figures provided to aid understanding of the disclosure are used to prevent the infringer from unfairly exploiting the stated disclosure.

As used herein, "electrochemical device" may mean a primary battery, a secondary battery, a super capacitor, or the like.

As used herein, "diameter" means D50, which is a diameter corresponding to 50% in the cumulative distribution of the number of particles along the diameter, unless otherwise specified.

As used herein, the "radius" of particles means the particle size (D50) of 50% of the integrated value from a smaller particle diameter calculated based on the results of measurement of particle size distribution of the particles after the classification thereof using a conventional particle size distribution measuring system. For example, such particle size distribution can be determined after dispersing the particles sufficiently in aqueous solution by using a suitable laser diffraction or scattering type particle size distribution measuring system, followed by agitation with an ultrasonic dispersing device.

As used herein, the term "majority" may be explained such that when it is stated that a "majority" of the inorganic particles are dispersed in a first surface region facing the porous polymer substrate, this means that the relative concentration of inorganic particles present in the first surface region is greater than the concentration of inorganic particles in other regions of the porous coating layer. In other words, the highest concentration of inorganic particles is present in the first surface region. Similarly, when it is stated that a majority of the second binder particles are dispersed in a second surface region opposite to the first surface region, this means that the relative concentration of second binder particles present in the second region is greater than the concentration of second binder particles in other regions of the porous coating layer. In other words, the highest concentration of second binder particles is present in the second region.

An embodiment of the present disclosure provides a separator including a porous polymer substrate and a porous coating layer on at least one side of the porous polymer substrate. Specifically, the porous coating layer includes first binder particles, second binder particles, and inorganic particles, in which a majority of the inorganic particles are dispersed in a first surface region facing the porous polymer substrate, a majority of the second binder particles are dispersed in a second surface region opposite the first surface region, and the inorganic particles have a weight per particle greater than each respective weight per particle of the first binder particles and the second binder particles.

The porous polymer substrate provides pores through which lithium ions may pass while preventing a short circuit by electrically insulating a cathode and an anode. The porous polymer substrate may have a resistance to the electrolyte, which may be an organic solvent, of the electrochemical device. For example, the porous polymer substrate may include polymer resins of polyolefins such as polyethylene, polypropylene, polybutene, polyvinyl chloride, polyethylene terephthalate, polycycloolefin, polyethersulfone, polyamide, polyimide, polyimideamide, polyaramid, nylon, polytetrafluoroethylene, and a copolymer or a mixture thereof but is not limited thereto. Preferably, the porous polymer substrate may include a polyolefin-containing polymer, thereby having excellent slurry coating properties for forming a porous coating layer and being advantageous for preparing a thin separator.

The thickness of the porous polymer substrate may be in a range of 1 μm to 100 μm, specifically 1 μm to 30 μm, and more preferably 15 μm to 30 μm. The porous polymer substrate may include pores having an average diameter in a range of 0.01 μm to 10 μm.

The slurry may be coated and dried on at least one surface of the porous polymer substrate to form a porous coating layer, to be described later. The slurry may also contain a surfactant.

The slurry may include first binder particles, second binder particles, inorganic particles, a dispersion medium, and the like. Before coating the slurry, surface treatment such as plasma treatment or corona discharge may be performed on the porous polymer substrate in order to improve the impregnability with the electrolyte.

As a surfactant in the slurry, examples may generally a nonionic surfactant, an anionic, cationic, or amphoteric surfactant, and more specific material types may be selectable within a range known in the art. For example, the surfactant may include dimethylsilicone, aminosilane, acrylsilane, vinylbenzylsilane, glycidylsilane, mercaptosilane, polydimethylsiloxane, or two or more of them. Amounts of surfactant included in the slurry may be 0.5 to 1% by weight of the slurry.

The separator may include a porous polymer substrate and a porous coating layer. The porous coating layer may be on one or both surfaces of the porous polymer substrate. A porous coating layer may be formed by applying and drying the slurry on at least one surface of the porous polymer substrate.

The porous coating layer may include inorganic particles for improving mechanical properties and insulating properties of the porous polymer substrate and a polymer binder for improving adhesive strength between the electrode and the separator. The polymer binder may include first binder particles and second binder particles, and the polymer binder may provide adhesive strength between the electrode and the separator, and at the same time, bind adjacent inorganic particles and maintain the bonding. The inorganic particles may combine with adjacent inorganic particles to provide an interstitial volume that is a void between the inorganic particles, and lithium ions may move through the interstitial volume.

At least one of the first binder particles and the second binder particles may be aqueous binder particles. The weight-average molecular weight of the aqueous binder particle may be 10,000 to 10,000,000. Preferably, both the first binder particle and the second binder particle may be water-containing binder particles (e.g., aqueous binder particles).

The first binder particles may provide an adhesive strength (dry adhesion) between the separator and the electrode in a dry state of the separator. An electrode assembly may be manufactured by laminating the separator and the electrode, and in this case, a dry adhesive strength between the separator and the electrode is important because there is no electrolyte yet present. The dry adhesive strength, which is the adhesive strength in a dry state, may be 10 gf/25 mm or more, preferably gf/25 mm to less than 100 gf/25 mm, and more preferably 50 gf/25 mm to less than 100 gf/25 mm. When the dry state adhesive strength is greater than 100 gf/25 mm, impregnating a separator with an electrolyte may be disturbed, and thus lithium dendrite may be deposited.

The second binder particles may provide an adhesive strength (wet adhesion) between the separator and the electrode in a state in which the separator is impregnated with the electrolyte. An electrochemical device may be manufactured by inserting the electrode assembly into a pouch or case and injecting an electrolyte. In this case, the separator is impregnated with the electrolyte so a wet adhesive strength between the separator and the electrode is important. The wet adhesive strength, which is the adhesive strength of the separator when the separator is impregnated with the electrolyte, may be 1.0 gf/20 mm or more, specifically 10 gf/20 mm or more, and more specifically 7 to 20 gf/20 mm. When the wet state adhesive strength is less than 1 gf/20 mm, the stiffness of the cell may be lowered, which may cause assembly problems or folding problems of the separator when manufacturing the electrode assembly or when the adhesive strength in the wet state exceeds 20 gf/20 mm, the separator impregnating with an electrolyte may be disturbed, and thus lithium dendrite may be deposited.

The first binder particles and the second binder particles may provide dry adhesive strength and wet adhesive strength, respectively. Preferably, the first binder particles may include an acrylic binder to provide dry adhesive strength between the separator and the electrode. For example, the first binder particles may be at least one selected from the group consisting of the polymers, including styrene-butadiene rubber, nitrile-butadiene rubber, acrylonitrile-butadiene rubber, and acrylonitrile-butadiene-styrene rubber, with acrylate. Preferably, the second binder particles may include a polyvinyl fluoride-containing binder to provide wet adhesive strength between the separator and the electrode. For example, the second binder particles may be at least one selected from the group consisting of the polymers, including polyvinylidene fluoride, polyhexafluoropropylene, polytetrafluoroethylene, polyvinylidene fluoride-hexafluoropropylene (PVDF-HFP), polyvinylidene fluoride-trichloroethylene (PVDF-TCE), polyvinylidene fluoride-chlorotrifluoroethylene (PVDF-CTFE), and polyvinylidene fluoride, with acrylate.

The inorganic particles may form a uniform thickness of the porous coating layer, and the redox reaction may not occur within the operating voltage range of the applied electrochemical device. For example, the inorganic particles may have at least one of lithium ion transport ability, piezoelectricity, and flame retardancy.

Inorganic particles having lithium ion transport ability mean that they contain elemental lithium but do not store lithium and have a function of moving lithium ions. Inorganic particles having the ability to transport lithium ions may transfer and move lithium ions due to some kind of defect present in the particle structure. Accordingly, the lithium ion conductivity in the electrochemical device is improved, thereby improving the performance of the electrochemical device.

For example, inorganic particles with lithium ion transport ability may be at least one selected from the group consisting of $Li_3PO_4$, $Li_xTi_y(PO_4)_3$ ($0<x<2$, $0<y<3$), $Li_xAl_yTi_z(PO_4)_3$ ($0<x<2$, $0<y<1$, $0<z<3$), $Li_xLa_yTiO_3$ ($0<x<2$, $0<y<3$), $Li_xGe_yP_zS_w$ ($0<x<4$, $0<y<1$, $0<z<1$, $0<w<5$), lithium nitride such as $Li_3N$ ($Li_xN_y$, $0<x<4$, $0<y<2$), SiS2-containing glass such as $Li_3PO_4$—$Li_2S$—$SiS_2$ ($Li_xSi_yS_z$, $0<x<3$, $0<y<2$, $0<z<4$), $P_2S_5$-containing glass such as LiI—$Li_2S$—$P_2S_5$($Li_xP_yS_z$, $0<x<3$, $0<y<3$, $0<z<7$), LLZO series such as $Li_7La_3Zr_2O_{12}$, and a mixture thereof but is not limited thereto.

Inorganic particles having piezoelectric properties refer to materials that are non-conductive at normal pressure but have the property of conducting electricity due to a change in internal structure when a predetermined pressure is applied. The inorganic particles may exhibit a high dielectric constant characteristic having a dielectric constant of 100 or more, and when a predetermined pressure is applied to tension or compression, an electric charge is generated so that one side is positively charged and the other side is negatively charged, thereby having a function of generating a potential difference between both sides. In the case of an internal short circuit between the anode and the cathode due to external impacts such as local crush or nail, not only the cathode and the anode do not directly contact due to the inorganic particles coated on the separator, but also a potential difference is generated within the particles due to the piezoelectricity of the inorganic particles, which results in electron movement between the cathode and the anode, that is, the flow of a minute current, thereby reducing the voltage of the electrochemical device gently and improving the safety thereof.

For example, inorganic particles with piezoelectric properties may include at least one selected from the group consisting of $BaTiO_3$, $BaSO_4$, $Pb(Zr,Ti)O_3$ (PZT), $Pb_{1-x}La_xZr_{1-y}Ti_yO_3$ (PLZT) ($0<x<1$, $0<y<1$), $Pb(Mg_{1/3}Nb_{2/3})O_3-PbTiO_3$ (PMN-PT), hafnia ($HfO_2$), or a mixture thereof but is not limited thereto.

Inorganic particles having flame retardancy may add flame retardant properties to the separator or prevent the temperature inside the electrochemical device from rapidly increasing.

For example, flame retardant inorganic particles may be at least one selected from the group consisting of $Sb_2O_3$, $Sb_2O_4$, $Sb_2O_5$, $SrTiO_3$, $SnO_2$, $CeO_2$, $MgO$, $Mg(OH)_2$, $NiO$, $CaO$, $ZnO$, $Zn_2SnO_4$, $ZnSnO_3$, $ZnSn(OH)_6$, $ZrO_2$, $Y_2O_3$, $SiO_2$, $Al_2O_3$, $AlOOH$, $Al(OH)_3$, $SiC$, $TiO_2$, $H_3BO_3$, $HBO_2$, and a mixture thereof but is not limited thereto.

The present disclosure may sequentially dispose the inorganic particles, the first binder particles, and the second binder particles starting from a surface region close to the porous polymer substrate in the porous coating layer by controlling the correlation between the physical properties of the inorganic particles, the first binder particles, and the second binder particles.

In the porous coating layer, the inorganic particles may be most distributed in a first surface region facing the porous polymer substrate. For example, 50% to 99.99% by weight of the inorganic particles included in the porous coating layer may be distributed on the first surface region of the porous coating layer.

In the porous coating layer, the second binder particles may be most distributed on a second surface region of the porous coating layer opposite the first surface region. For example, 50% to 99.99 wt % of the second binder particles included in the porous coating layer may be distributed in the second surface of the porous coating layer. For instance, the second binder particles may be most distributed in the second surface region, which may correspond to an outermost surface of the separator, so when the separator is impregnated in the electrolyte, excellent adhesion to the electrode may be exhibited.

The inorganic particles may have greater densities than that of each of the respective first binder particles and second binder particles. The second binder particles may have a greater density than the first binder particles. For example, the density of the inorganic particles may be 3 $g/cm^3$ or more, the density of the second binder particles may be 1.1 to 2 $g/cm^3$, and the density of the first binder particles may be 1.2 $g/cm^3$ or less.

When the slurry is coated to the porous polymer substrate, the inorganic particles may be distributed in the direction of facing the surface of the porous polymer substrate due to a difference in particle density. The first binder particles and the second binder particles may be stacked on the inorganic particles. For example, as shown in FIG. 1, the second binder particles may be stacked on the inorganic particles, and the first binder particles may be stacked on the second binder particles, but the first binder particles and the second binder particles may be randomly distributed and stacked on the inorganic particles.

The inorganic particles may have a weight per particle greater than each respective weight per particle of the first and second binder particles. The first binder particles may have a greater weight per particle than that of the second binder particles. When forming the porous coating layer, the heaviest inorganic particles are distributed in the surface region facing the porous polymer substrate, and the lightest second binder particles may move to the opposite surface region of the porous coating layer faster than the first binder particles.

Each of the first binder particles and the inorganic particles may be spherical particles, and the diameter of the first binder particles may be greater than or equal to the radius of the inorganic particles. For example, the radius of the inorganic particles may be 250 nm to 2500 nm, and the diameter of the first binder particles may be greater than or equal to the radius of the inorganic particles. When the radius of the inorganic particles is less than 250 nm, a polymer binder for bonding between the inorganic particles may be additionally required, which is disadvantageous in terms of electrical resistance. When the radius of the inorganic particles exceeds 2500 nm, the uniformity of the surface of the coating layer may be lowered, and the separator and the electrode may be damaged during lamination by the protruding particles after coating, which may cause a short circuit. When the diameter of the first binder particles is smaller than the radius of the inorganic particles, the first binder particles may be interposed between the inorganic particles so that sufficient dry adhesive strength cannot be ensured. Preferably, the diameter of the first binder particles may be greater than the radius of the inorganic particles.

The second binder particles may be spherical particles, and the diameter of the second binder particles may be greater than or equal to the radius of the first binder particles. When the slurry is dried, the dispersion medium included in the slurry evaporates, thereby causing movement of the first and second binder particles. The moving speed of the second binder particles having a light weight per particle, may be faster than that of the first binder particles. The second binder particles may move through the first binder particles to the region opposite to the side facing the porous polymer substrate, and after the movement, the diameter of the second binder particles may be larger than the radius of the first binder particles, and thus may not move any more in the direction of the porous polymer substrate. When the diameter of the second binder particles is smaller than the radius of the first binder particles, the second binder particles may be interposed between the first binder particles so that sufficient wet adhesive strength cannot be ensured. Preferably, the diameter of the second binder particles may be greater than the radius of the first binder particle.

In the porous coating layer formed by evaporation of the dispersion medium, a concentration gradient of the second binder particles, the first binder particles, and the inorganic particles may be formed from the outermost part of the coating layer toward the porous polymer substrate.

Most of the second binder particles may be dispersed in the second surface region (the region opposite to the region facing the porous polymer substrate) of the porous coating layer and the least distributed in the surface region (e.g., the first surface region) facing the porous polymer substrate.

Most of the first binder particles may be dispersed in a region between the second surface region of the porous coating layer and the first surface region facing the porous polymer substrate.

Most of the inorganic particles are dispersed in the first surface region facing the porous polymer substrate and the least are dispersed in the second surface region of the porous coating layer.

Both the second binder particles and the first binder particles are distributed on the second surface region of the porous coating layer, and the second binder particles may be more distributed than the first binder particles. For example, 10% to 50% by weight of the first binder particles included in the porous coating layer may be distributed on the second surface region of the porous coating layer. The first binder particles distributed on the second surface region of the porous coating layer may provide dry adhesive strength, and the second binder particles distributed on the second surface region of porous coating layer may provide wet adhesive strength.

The porous coating layer may include a polymer binder, including the first binder particles and the second binder particles, and the inorganic particles in a weight ratio of 10:90 to 50:50. When the polymer binder is included in less than the above range, the porous coating layer may be peeled off from the porous polymer substrate, or it may not possible to secure sufficient adhesive strength between the electrode and the separator, and when the content of the polymer binder is included in excess of the above range, there may be a problem that the resistance of the cell becomes too large.

The porous coating layer may include the first binder particles and the second binder particles in a weight ratio of 1:0.5 to 1:1.5. When the second binder particles are included in less than the above range, the adhesive strength between the electrode and the separator may not be maintained in the state in which the electrolyte is impregnated. When the second binder particles are included in excess of the above range, the second binder particles may not be sufficiently distributed on the surface region (e.g., second surface region) of the porous coating layer, so that adhesive strength between the electrode and the separator may not be maintained in the state in which the separator is impregnated with an electrolyte.

The porous coating layer may have a thickness in a range of 1.5 μm to 5 μm. When the thickness of the porous coating layer is less than 1.5 μm, the wet adhesive strength may be rapidly lowered, and thus the electrode and the separator may be peeled off when the electrolyte is injected. Even if the thickness of the porous coating layer exceeds 5 μm, the adhesive strength between the separator and the electrode does not significantly increase.

The porous coating layer may further include a dispersing agent to further improve the dispersibility of the inorganic particles. The dispersing agent functions to maintain a uniformly dispersed state of the inorganic particles in the polymer binder when the slurry is prepared. For example, the dispersing agent may include any one or more selected from among oil-soluble polyamines, oil-soluble amine compounds, fatty acids, fatty alcohols, sorbitan fatty acid esters, tannic acid, and pyrogallic acid. When the slurry includes a dispersing agent, the porous coating layer may include a dispersing agent in an amount of 5% by weight or less.

Another embodiment of the present disclosure provides an electrochemical device including a cathode, an anode, a separator interposed between the cathode and the anode, and an electrolyte, in which the separator is according to the above-described embodiment.

The cathode and the anode may be obtained by applying and drying an active material on at least one surface of each current collector. The current collector may be made of a conductive material without causing a chemical change in the electrochemical device. For example, the current collector for the cathode may be aluminum, nickel, titanium, calcinated carbon, stainless-steel; aluminum or stainless-steel surface treated with carbon, nickel, titanium, silver, etc., but is not limited thereto. For example, the current collector for the anode is copper, nickel, titanium, calcinated carbon, stainless-steel; copper or stainless-steel surface treated with carbon, nickel, titanium, silver, etc., but is not limited thereto. The current collector may be in various forms, such as a thin metal plate, a film, a foil, a net, a porous substrate, and a foamed substrate.

The cathode active material may include: lithium cobalt oxide ($LiCoO_2$); lithium nickel oxide ($LiNiO_2$); lithium manganese oxides of the formula $Li_{1+x}Mn_{2-x}O_4$ (where x is 0 to 0.33), $LiMnO_3$, $LiMn_2O_3$, $LiMnO_2$, and the like; lithium copper oxide ($Li_2CuO_2$); vanadium oxides such as $LiV_3O_8$, $LiV_3O_4$, $V_2O_5$, and $Cu_2V_2O_7$; Ni site-type lithium nickel oxide represented by the formula $LiNi_{1-x}M_xO_2$ (where M=Co, Mn, Al, Cu, Fe, Mg, B, or Ga, and x=0.01 to 0.3); lithium manganese composite oxide represented by the formula $LiMn_{2-x}M_xO_2$ (where M=Co, Ni, Fe, Cr, Zn, or Ta, and x=0.01 to 0.1) or $Li_2Mn_3MO_8$ (where M=Fe, Co, Ni, Cu, or Zn); $LiMn_2O_4$ in which a part of Li in the formula is substituted with an alkaline earth metal ion; disulfide compounds; $Fe_2(MoO_4)_3$, and the like may be included but is not limited thereto.

The anode current collector may include carbons such as non-graphitized carbon and graphite-containing carbon; metal composite oxides such as $Li_xFe_2O_3$ (0<x<1), $Li_xWO_2$ (0<x<1), $Sn_xMe_{1-x}Me'_yO_z$ (Me: Mn, Fe, Pb, Ge; Me': Al, B, P, Si, elements of groups 1, 2, and 3 of the periodic table, halogen; 0<x<1; 1<y<3; 1<z<8); lithium metal; lithium alloy; silicon-containing alloys; tin-containing alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-containing materials, but are not limited thereto.

The electrolyte may be a lithium salt-containing non-aqueous electrolyte. The electrolyte includes of an electrolyte and a lithium salt, and as the electrolyte, a non-aqueous organic solvent, an organic solid electrolyte, an inorganic solid electrolyte, and the like may be used.

Examples of the non-aqueous organic solvent may include aprotic organic solvents such as N-methyl-2-pyrrolidinone, propylene carbonate, ethylene carbonate, butylene carbonate, dimethyl carbonate, diethyl carbonate, gamma-butyrolactone, 1,2-dimethoxy ethane, tetrahydrofuran, 2-methyl tetrahydrofuran, dimethyl sulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, or ethyl propionate.

Examples of the organic solid electrolyte may include a polymerization agent etc., including polyethylene derivatives, polyethylene oxide derivatives, polypropylene oxide derivatives, phosphoric acid ester polymers, polyalginate lysine, polyester sulfide, polyvinyl alcohol, polyvinylidene fluoride, and an ionic dissociation group.

Examples of the inorganic solid electrolyte may include a lithium nitride such as $Li_3N$, LiI, $Li_5NI_2$, $Li_3NLiI$—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$; halides, sulfates, and the like.

The lithium salt is a material readily soluble in the non-aqueous electrolyte, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, lithium chloroborane, lithium lower aliphatic carboxylate, lithium tetraphenyl borate, imide, and the like.

The electrochemical device may be manufactured by inserting a cathode, an anode, a separator, and an electrolyte into a case or a pouch and sealing. The shape of the case or pouch is not limited. For example, the electrochemical device may be a cylindrical, prismatic, coin-type, or pouch-type lithium secondary battery.

The lithium secondary battery is packed or modularized as a unit cell to be used in a small device such as a computer, a mobile phone, and a power tool; a power tool that is powered by a battery motor; electric vehicles, including electric vehicles (EVs), hybrid electric vehicle (HEVs), plug-in hybrid electric vehicles (PHEVs), and the like; electric bicycle (E-bikes); electric two-wheeled vehicle including electric scooter (E-scooter); electric golf cart; and a large device such as power storage system.

Hereinafter, the present disclosure will be described in more detail through specific Examples and Experimental Examples. The following Examples and Experimental Examples are intended to illustrate the present disclosure, but the present disclosure is not limited by the following Examples and Experimental Examples.

Examples 1 and 2

Preparation of the Slurry

After adding inorganic particles and dispersing agent having the density (g/cm$^3$), diameter (nm), and weight per particle ($\times 10\text{-}14$ g), as shown in Table 1 below, in distilled water at room temperature, and then bead milling (injecting 0.7 μm zirconia beads in the same amount as inorganic particles, and milling for 2 hours using a paint shaker) was performed to prepare an inorganic dispersion solution. A polymer binder having a density (g/cm$^3$), diameter (nm), and weight per particle ($\times 10^{-14}$ g), as shown in Table 1 below, was added to the prepared inorganic dispersion solution. At this time, as the polymer binder, the first binder particles and the second binder particles were added in the weight ratios shown in Table 1, and a surfactant was additionally added to improve wettability with the fabric. A copolymer of styrene-butadiene was used as the first binder, a copolymer of PVdF-butyl acrylate was used as the second binder and a dimethylsilicone (0.5 wt % of slurry) was used as the surfactant. A slurry in which binder particles and inorganic particles were dispersed was prepared by stirring at 10 rpm for 10 minutes.

Preparation of Porous Polymer Substrate

A polyethylene film (PE) having a thickness of 9 μm was used as the porous polymer substrate.

Separator Preparation

The slurry was coated on both sides of the polyethylene film using a doctor blade and dried using a hot air blower to form a porous coating layer having a thickness of 2.5 μm for each applying, thereby preparing a separator having a total thickness of about 14 μm.

Comparative Examples 1 to 5

A separator was prepared in the same manner as in Examples 1 and 2, except that inorganic particles and polymer binders of the density, diameter, and weight per particle described in Tables 1 and 2 below were used to prepare the slurry. Comparative Examples 1 to 3 used only the first binder particles as the polymer binder.

Experimental Example 1. Measurement of the Adhesive Strength of the Separator

Dry adhesion and wet adhesive strengths of the separators according to Examples 1 and 2 and Comparative Examples 1 to 5 were confirmed and shown in Tables 1 and 2 below.

Dry Adhesive Strength

A separator having a size of 2 cm×6 cm was laminated on one side of an anode having a size of 2.5 cm×6 cm and pressurized at 60° C. with a pressure of 6.5 MPa for 1 second. Thereafter, the anode was fixed using a UTM (Universal Test Machine, Instron), and the separator was peeled off at a rate of 300 mm/min in a 180° direction, and the peel strength (gf/25 mm) was measured.

Wet Adhesive Strength

A separator of the same size was laminated on one side of a cathode having a size of 2 cm×6 cm, pressurized at 60° C. at a pressure of 6.5 MPa for 1 second, inserted into a pouch, and 1.0 g of electrolyte (including 1.0 M of LiPF$_6$ at EC/EMC 3:7) injected and left at room temperature for one day.

The laminate of the cathode and the separator was taken out of the pouch and pressurized at 70° C. at a pressure of 5 kgf for 5 minutes and then left at room temperature for 1 hour. Thereafter, the cathode was fixed using UTM, and the separator was peeled off at a rate of 200 mm/min in a 90° direction, and the peel strength (gf/20 mm) was measured.

TABLE 1

| | | Comparative Example 1 | Comparative Example 2 | Example 1 | Example 2 |
|---|---|---|---|---|---|
| Inorganic materials Particle | Density (g/cm$^3$) | 4.0 | 4.0 | 4.0 | 4.0 |
| | Diameter (nm) | 500 | 500 | 500 | 500 |
| | Weight ($\times 10^{-14}$ g) | 26 | 26 | 26 | 26 |
| First Binder Particle | Density (g/cm$^3$) | 1.0 | 1.0 | 1.2 | 1.0 |
| | Diameter (nm) | 230 | 350 | 400 | 400 |
| | Weight ($\times 10^{-14}$ g) | 0.64 | 2.20 | 4.00 | 3.40 |
| Second Binder Particle | Density (g/cm$^3$) | — | — | 1.2 | 1.5 |
| | Diameter (nm) | — | — | 360 | 300 |
| | Weight ($\times 10^{-14}$ g) | — | — | 2.90 | 2.10 |
| Weight ratio (First binder particle: Second binder particle) | | 1:0 | 1:0 | 1:0.7 | 1:0.6 |
| Dry adhesive strength (gf/25 mm) | | 10 | 55 | 53 | 52 |
| Wet adhesive strength (gf/20 mm) | | 0 | 0 | 14 | 17 |

TABLE 2

| | | Comparative Example 3 | Comparative Example 4 | Comparative Example 5 |
|---|---|---|---|---|
| Inorganic materials Particle | Density (g/cm$^3$) | 4.0 | 4.0 | 4.0 |
| | Diameter (nm) | 500 | 500 | 500 |
| | Weight ($\times 10^{-14}$ g) | 26 | 26 | 26 |
| First Binder Particle | Density (g/cm$^3$) | 1.0 | 1.0 | 1.0 |
| | Diameter (nm) | 400 | 350 | 400 |
| | Weight ($\times 10^{-14}$ g) | 3.40 | 2.20 | 3.40 |
| Second Binder | Density (g/cm$^3$) | — | 1.2 | 1.1 |

TABLE 2-continued

|  | Comparative Example 3 | Comparative Example 4 | Comparative Example 5 |
|---|---|---|---|
| Particle Diameter (nm) | — | 400 | 150 |
| Weight ($\times 10^{-14}$ g) | — | 4.00 | 0.19 |
| Weight ratio (First binder particle: Second binder particle) | 1:0 | 1:1.8 | 1:0.1 |
| Dry adhesive strength (gf/25 mm) | 60 | 50 | 58 |
| Wet adhesive strength (gf/20 mm) | 0 | 2 | 3 |

Experimental Example 2. Checking the Surface Condition of the Separator

The surfaces of the separators according to Examples 1 and 2 and Comparative Examples 1 and 5 were observed by SEM and are shown in FIGS. 2 to 5, respectively. In the Comparative Examples, the binder particles are present in the space between the inorganic particles, so the binder is not distributed on the surface.

In Comparative Example 4, since the second binder particle has a greater density than the first binder particle, the second binder particle is not distributed on the first binder particle (on the surface of the separator).

Figure 5:
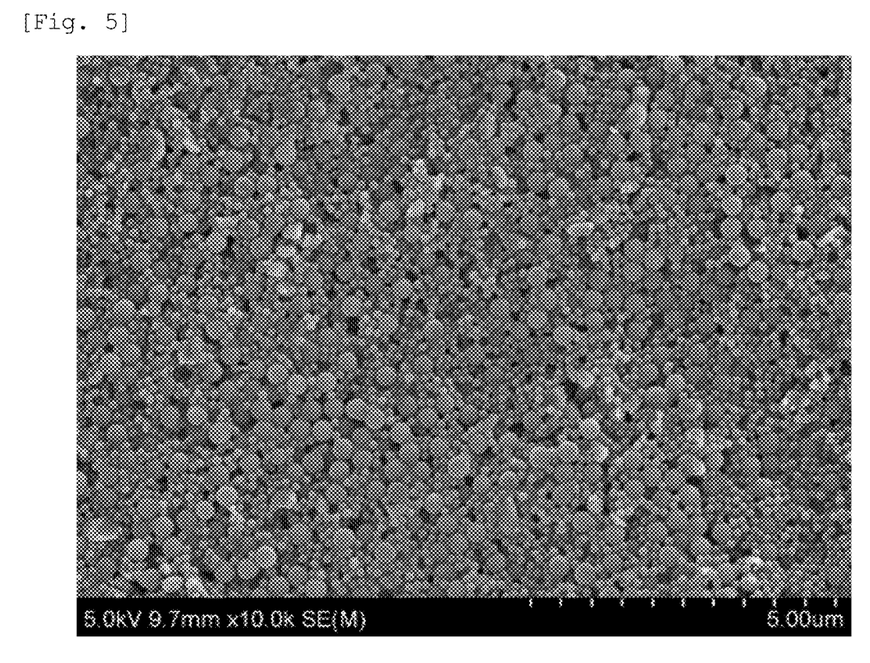
FIG. 5 shows an SEM image of a cross-section of the separator of Comparative Example 5.

In Comparative Example 5, since the diameter of the second binder particle is too small, the second binder particle is not distributed on the first binder particle because the second binder particle is present between the first binder particles (or between the inorganic particles).

Therefore, the wet adhesion strength for each of Comparative Example 4 and Comparative Example 5 are relatively low, i.e., 2 gf/20 mm and 3 gf/20 mm, respectively.

Figure 4:
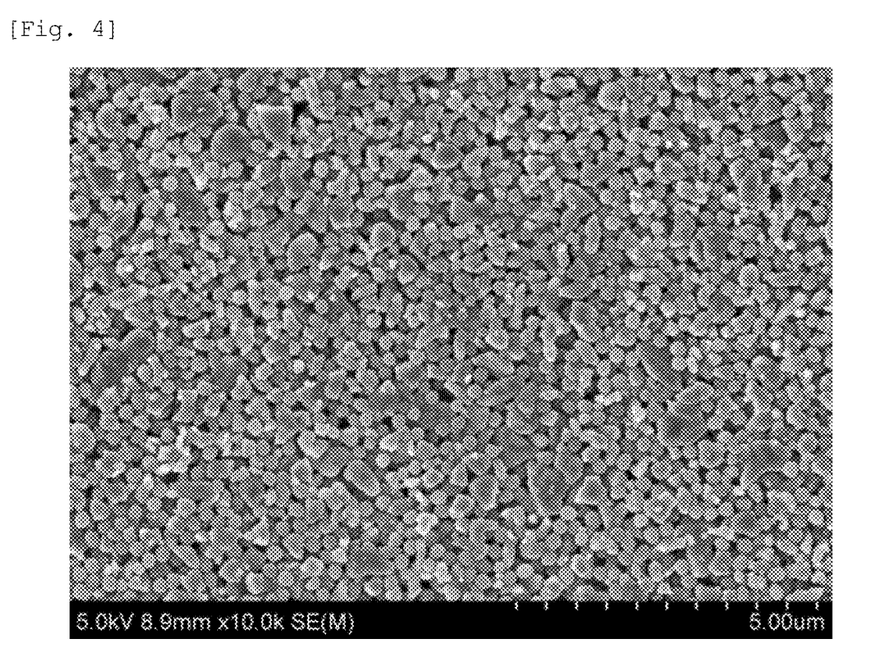
FIG. 4 shows an SEM image of a cross-section of the separator of Comparative Example 1.

FIG. 4, which represents Comparative Example 1, shows that some of the first binder particles, which has a small diameter compared to the inorganic particles, is distributed on the inorganic particles, while some first binder particles were "sandwiched" between inorganic particles.

FIG. 5, which represents Comparative Example 5, shows that the first binder particles and the second binder particles are distributed on the inorganic particles, so the inorganic particles were not observed. In addition, the diameter of the second binder particle is too small such that the second binder particle is "sandwiched" between the first binder particles. FIG. shows that the second binder particles are not well distributed on the surface of the separator.

What is claimed is:

1. A separator for an electrochemical device, the separator comprising:
   a porous polymer substrate; and
   a porous coating layer present directly on at least one side of the porous polymer substrate,
   wherein
   the porous coating layer comprises first binder particles, second binder particles, and inorganic particles,
   a majority of the inorganic particles are dispersed in a first surface region of the porous coating layer, the first surface region facing the porous polymer substrate,
   a majority of the second binder particles are dispersed in a second surface region of the porous coating layer, the second surface region being an opposite surface region to the first surface region, and
   the first binder particles have a diameter (D50) larger than or equal to a radius of the inorganic particles.

2. The separator of claim 1, wherein the inorganic particles have a larger weight per particle than each respective weight per particle of the first and second binder particles.

3. The separator of claim 1, wherein the first binder particles have a larger weight per particle than a weight per particle of the second binder particles.

4. The separator of claim 1, wherein at least one of the first binder particles or the second binder particles are aqueous binder particles.

5. The separator of claim 1, wherein the first binder particles and the inorganic particle are spherical particles.

6. The separator of claim 1, wherein the second binder particles are spherical particles, and
   the second binder particles have a diameter (D50) larger than or equal to a radius of the first binder particles.

7. The separator of claim 1, wherein the second binder particles have a higher density than the first binder particles.

8. The separator of claim 1, wherein the first binder particles are configured to provide adhesive strength between the separator and an electrode in a dry state, and
   the second binder particles are configured to provide adhesive strength between the separator and the electrode in a state in which the separator is impregnated with an electrolyte.

9. The separator of claim 1, wherein the inorganic particles are at least one selected from the group consisting of $Li_3PO_4$, $Li_xTi_y(PO_4)_3$ ($0<x<2$, $0<y<3$), $Li_xAl_yTi_z(PO_4)_3$ ($0<x<2$, $0<y<1$, $0<z<3$), $Li_xLa_yTiO_3$ ($0<x<2$, $0<y<3$), $Li_xGe_yP_zS_w$ ($0<x<4$, $0<y<1$, $0<z<1$, $0<w<5$), $Li_xN_y$ ($0<x<4$, $0<y<2$), $Li_xSi_yS_z$ ($0<x<3$, $0<y<2$, $0<z<4$), $Li_xP_yS_z$ ($0<x<3$, $0<y<3$, $0<z<7$), $Li_7La_3Zr_2O_{12}$, $BaTiO_3$, $BaSO_4$, $Pb(Zr, Ti)O_3$ (PZT), $Pb_{1-x}La_xZr_{1-y}Ti_yO_3$ (PLZT, $0<x<1$, $0<y<1$), $Pb(Mg_{1/3}Nb_{2/3})O_3$—$PbTiO_3$ (PMN-PT), $HfO_2$, $Sb_2O_3$, $Sb_2O_4$, $Sb_2O_5$, $SrTiO_3$, $SnO_2$, $CeO_2$, $MgO$, $Mg(OH)_2$, $NiO$, $CaO$, $ZnO$, $Zn_2SnO_4$, $ZnSnO_3$, $ZnSn(OH)_6$, $ZrO_2$, $Y_2O_3$, $SiO_2$, $Al_2O_3$, $AlOOH$, $Al(OH)_3$, $SiC$, $TiO_2$, $H_3BO_3$, and $HBO_2$.

10. The separator of claim 1, wherein the porous coating layer comprises a polymer binder and the inorganic particles in a weight ratio in a range of 10:90 to 50:50, and the polymer binder comprises the first binder particles and the second binder particles.

11. The separator of claim 1, wherein the porous coating layer comprises the first binder particles and the second binder particles in a weight ratio in a range of 1:0.5 to 1:1.5.

12. The separator of claim 1, wherein the porous coating layer has a thickness in a range of 1.5 μm to 5 μm.

13. An electrochemical device comprising a cathode, an anode, and the separator of claim 1 disposed between the cathode and the anode.

* * * * *